(12) United States Patent
Kempf et al.

(10) Patent No.: US 12,556,673 B2
(45) Date of Patent: Feb. 17, 2026

(54) OPTICALLY OFFSET THREE-DIMENSIONAL IMAGER

(71) Applicant: Texas Instruments Incorporated, Dallas, TX (US)

(72) Inventors: Jeffrey Matthew Kempf, Dallas, TX (US); Vikrant R. Bhakta, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 442 days.

(21) Appl. No.: 15/826,181

(22) Filed: Nov. 29, 2017

(65) Prior Publication Data

US 2019/0166348 A1 May 30, 2019

(51) Int. Cl.
| | |
|---|---|
| *H04N 13/189* | (2018.01) |
| *G01B 11/25* | (2006.01) |
| *G02B 26/08* | (2006.01) |
| *G06T 7/521* | (2017.01) |
| *H04N 13/204* | (2018.01) |
| *H04N 23/56* | (2023.01) |

(52) U.S. Cl.
CPC ....... *H04N 13/189* (2018.05); *G01B 11/2513* (2013.01); *G02B 26/0833* (2013.01); *G06T 7/521* (2017.01); *H04N 13/204* (2018.05); *H04N 23/56* (2023.01)

(58) Field of Classification Search
CPC ..... H04N 13/189; H04N 13/204; G06T 7/521
See application file for complete search history.

(56) References Cited

U.S. PATENT DOCUMENTS

| | | | |
|---|---|---|---|
| 2005/0007603 A1* | 1/2005 | Arieli | G01J 9/02 356/601 |
| 2007/0206201 A1* | 9/2007 | de Groot | G01B 9/02007 356/512 |

(Continued)

OTHER PUBLICATIONS

Structured-light 3D surface imaging: a tutorial, Jason Geng, IEEE Intelligent Transportation System Society, Received Sep. 22, 2010; revised Dec. 10, 2010; accepted Dec. 20, 2010; published Mar. 31, 2011 (Doc. ID 134160) (Year: 2011).*

(Continued)

*Primary Examiner* — Hesham K Abouzahra
(74) *Attorney, Agent, or Firm* — Michael T. Gabrik; Frank D. Cimino

(57) ABSTRACT

Described examples include an imager includes a light source; a spatial light modulator to receive light from the light source and to provide patterned light to illuminate an object; a sensor to receive a first and an offset reflected light from reflection of the patterned light off an object; and a processor to receive sensed images of the first reflected light and the offset reflected light and apply a deconvolution to a combined image including a combination of the sensed images of the first reflected light and the offset reflected light to generate the combined image having pixel density greater than the sensed images of the first reflected light and the offset reflected light, wherein the processor is configured to determine a position of at least one point on the object by triangulation between the spatial light modulator and the sensor using the patterned light and the combined image.

15 Claims, 16 Drawing Sheets

(56) References Cited

U.S. PATENT DOCUMENTS

| | | | |
|---|---|---|---|
| 2015/0215547 A1* | 7/2015 | Muller | H04N 5/265 |
| | | | 348/598 |
| 2016/0037147 A1* | 2/2016 | Kempf | H04N 9/3105 |
| | | | 348/744 |
| 2016/0119595 A1* | 4/2016 | Lyubarsky | G02B 27/0961 |
| | | | 353/121 |

OTHER PUBLICATIONS

Donoho, "Compressed Sensing," IEEE Transactions on Information Theory, vol. 52, No. 4, Apr. 2006, DOI: 10.1109/TIT.2006.871582, Institute of Electrical and Electronics Engineers, 445 Hoes Lane, Piscataway, NJ 08854-4141 USA.

Geng, "Structured-light 3D surface imaging: a tutorial," Advances in Optics and Photonics 3, 128-160 (2011) doi:10.1364/AOP.3.000128, OSA—The Optical Society, 2010 Massachusetts Ave., N.W., Washington, D.C. 20036-1012 USA.

* cited by examiner

OPTICALLY OFFSET THREE-DIMENSIONAL IMAGER

TECHNICAL FIELD

This relates generally to imaging of three-dimensional objects, and to structured-light imaging.

BACKGROUND

Structured-light imaging is a technique for capturing a digital representation of an object. A structured light source projects light structures, for example a series of stripes, onto the object. A light source modulated by a spatial light modulator (SLM) often provides the structured light. A sensor or sensor array captures the structured light reflected off the object. Epipolar geometry, such as triangulation, determines a three-dimensional point location for the points in the portion of the object illuminated by the structured light from the distortions to the reflected image caused by the object. This process repeats until the object is imaged. The precision of the depth map of the object is a function of projector resolution (SLM), camera (sensor array) resolution, projector field of view (FOV), camera FOV, and distance between camera and projector (baseline). The resolution of the sensor array and/or the resolution of the SLM providing the structured light, limits, in part, the accuracy of the three-dimensional image. A higher resolution SLM and/or sensor may provide more accurate images. However, the cost of the sensors, SLMs, associated optics and associated circuitry rises geometrically with the resolution.

SUMMARY

In accordance with an example, an imager includes a light source and a spatial light modulator to receive light from the light source and to provide patterned light to illuminate an object. The imager further includes a sensor to receive first reflected light from reflection of the patterned light off an object and to receive offset reflected light from reflection of the patterned light off the object. The imager further includes a processor to receive sensed images of the first reflected light and the offset reflected light and apply a deconvolution to a combined image including a combination of the sensed images of the first reflected light and the offset reflected light to generate the combined image having pixel density greater than the sensed images of the first reflected light and the offset reflected light, wherein the processor is configured to determine a position of at least one point on the object by triangulation between the spatial light modulator and the sensor using the patterned light and the combined image.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled." The term "plurality" means two or more.

Figure 1:
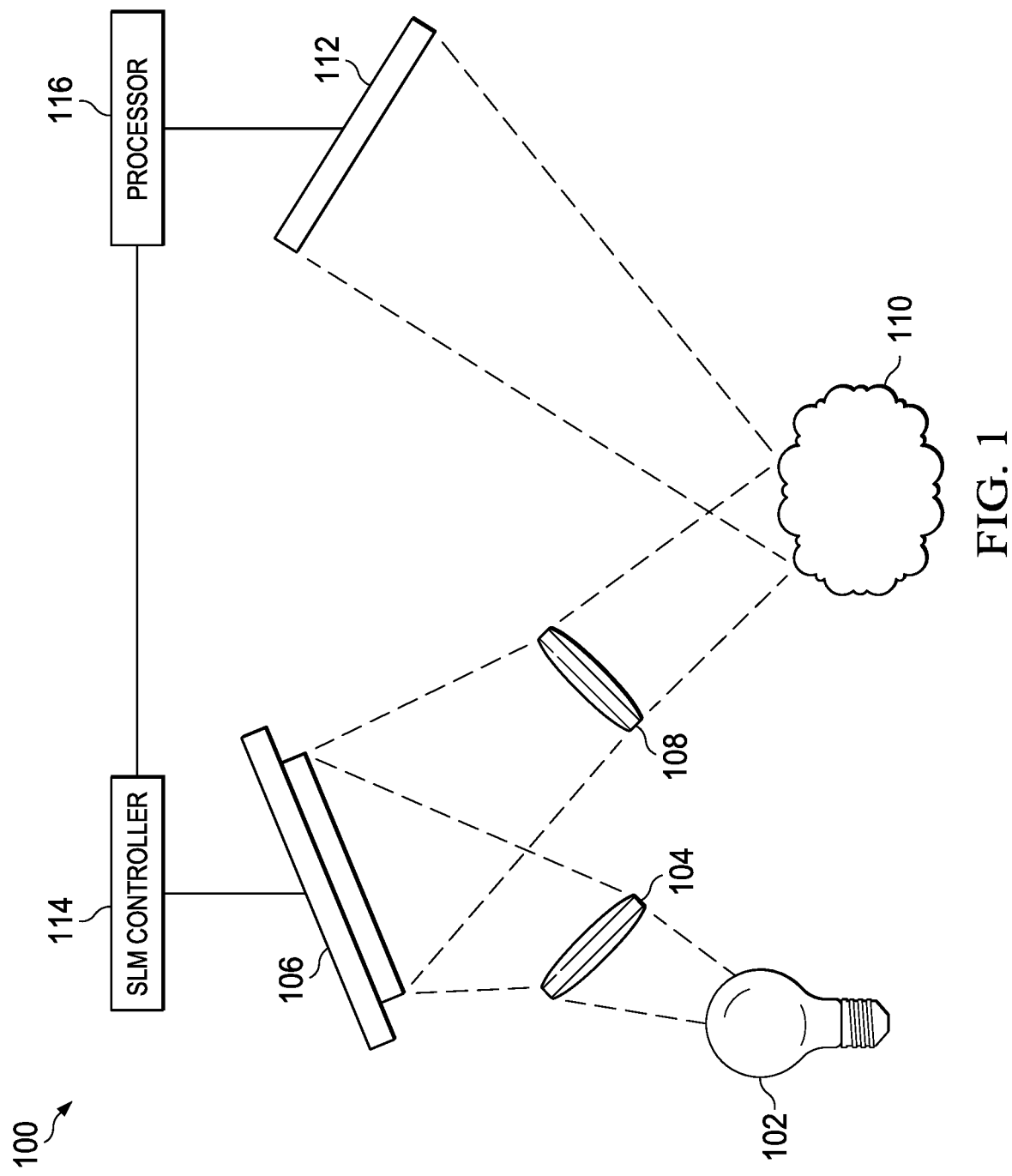
FIG. 1 is a schematic diagram of a structured-light imaging device.

FIG. 1 is a schematic diagram of a structured-light imaging device 100. Lens 104 focuses light from light source 102 onto spatial light modulator (SLM) 106. Lenses herein may be one lens or a multi-lens system. An example SLM 106 is a digital micromirror device (DMD) such as those available from Texas Instruments Incorporated. SLM 106 directs selected pixels of light from lens 104 in the form of the light structure. Stripes are one form of structured light. In some examples, SLM 106 produces many other example light structures, some of which are described in Geng, "Structured-light 3D Surface Imaging: a Tutorial," Advances in Optics and Photonics 3, 128-160 (2011), which is wholly incorporated herein by reference. Lens 108 focuses the structured light onto object 110. Sensor 112 receives the reflection of the structured light from object 110 to provide a sensed image. In this example, sensor 112 is a charge-coupled device (CCD) or complementary metal-oxide semiconductor (CMOS) based array of optical sensors. Processor 116 receives the data for the sensed light from sensor 112. Processor 116 controls SLM controller 114, which controls SLM 106. Processor 116 instructs SLM controller 114 so that SLM 106 produces the structure of light selected by processor 116. Therefore, processor 116 knows the configuration of the structured light. There is a fixed positional relationship between SLM 106 and sensor 112. Therefore, using epipolar analysis like triangulation, processor 116 determines the three-dimensional position in space on the object of each pixel of the structured light that illuminates the object. Processor 116 repeats the process using structured light with a different position to determine all points on the surface of object 110.

Figure 2:
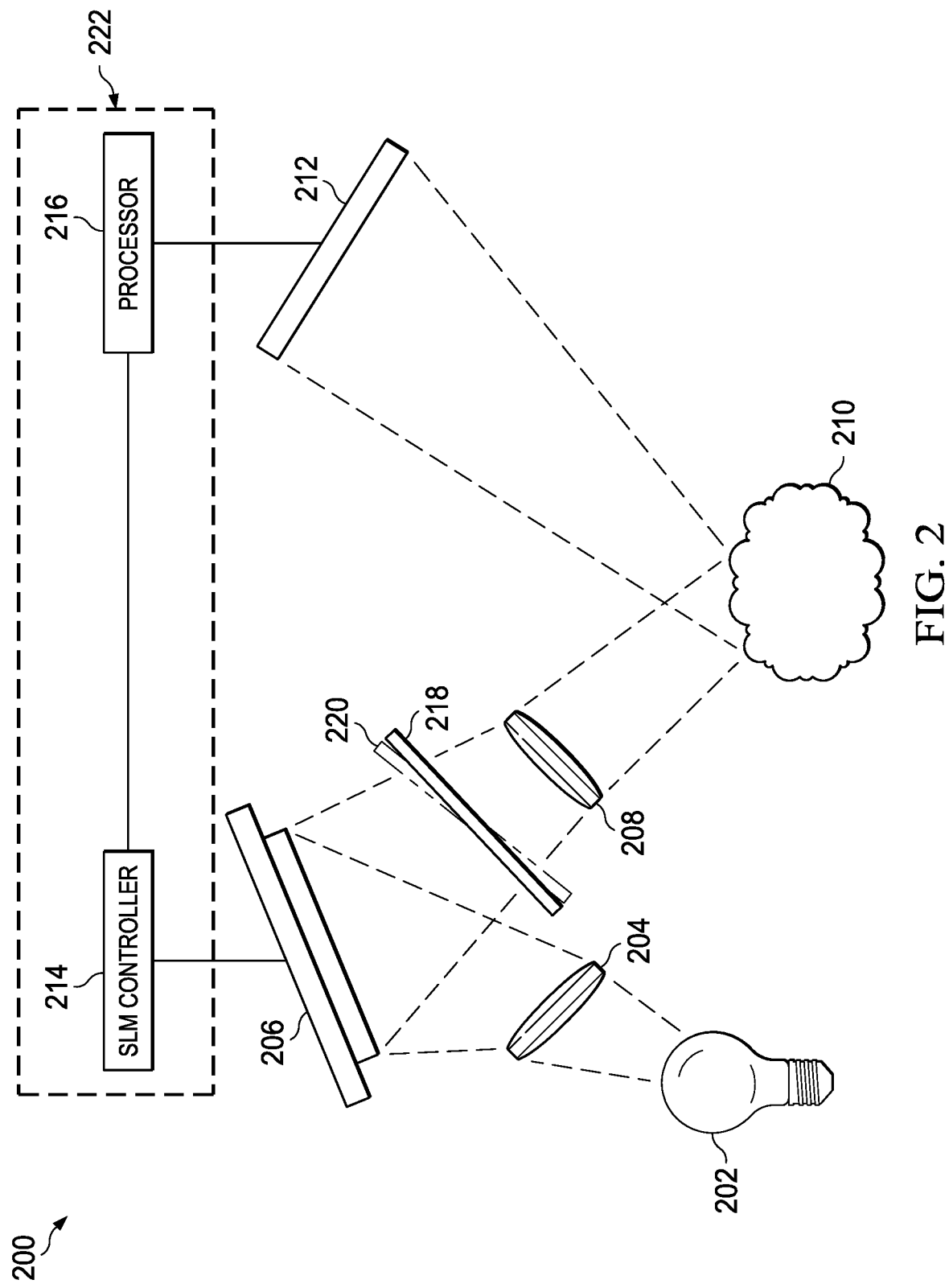
FIG. 2 is a schematic diagram of an example structured-light imaging device.

FIG. 2 is a schematic diagram of an example structured-light imaging device 200. Light source 202, lens 204, SLM 206, lens 208, object 210, sensor 212, processor 216 and SLM controller 214 are like light source 102, lens 104, SLM 106, lens 108, object 110, sensor 112, processor 116 and SLM controller 114, respectively. In an example, processor 216 and SLM controller 214 are separate integrated circuits. In an alternative example processor 216 and SLM controller 214 are on one combined integrated circuit 222. In additional examples, processor 216 and SLM 214 are in a hybrid package including the components in combinations of integrated circuits. Processor 216 is implemented by one of: a microprocessor, microcontroller, digital signal processor (DSP), application specific integrated circuit (ASIC), field programmable gate array (FPGA) or other suitable processing device. Structured-light imaging device 200 also includes movable plate 218. Movable plate 218 rotates slightly mechanically, to, for example, position 220. Its function is to shift or offset the image projected from SLM 206 by a small amount, for example by ½ pixel. As further explained hereinbelow, projecting two identical structured-light images enables imaging with a pixel density approximately double the pixel density of SLM 206. In other words, structure light imaging device captures a complete set of structured light patterns at one SLM position, spatially offsets the SLM, and then captures a second set of structured light patterns. The process is not limited to two positions. There is a tradeoff between depth accuracy, time of acquisition, and cost of the optical actuator.

Figure 3A:
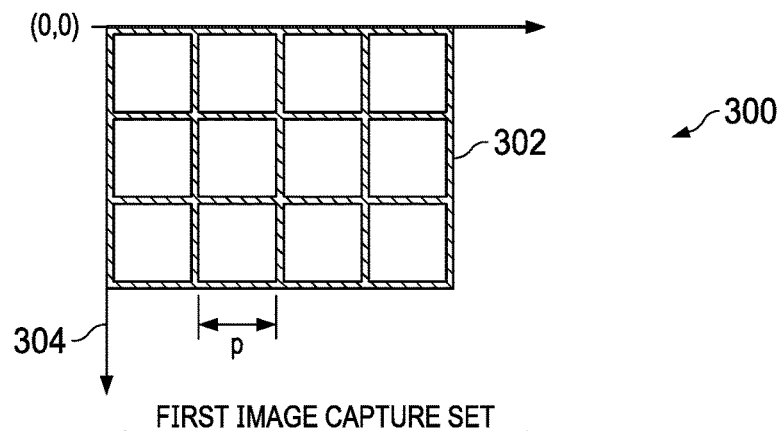
FIG. 3A, FIG. 3B and FIG. 3C (collectively "FIG. 3") is a group of charts describing the operation of structured-light imaging device of FIG. 2.
Figure 3B:
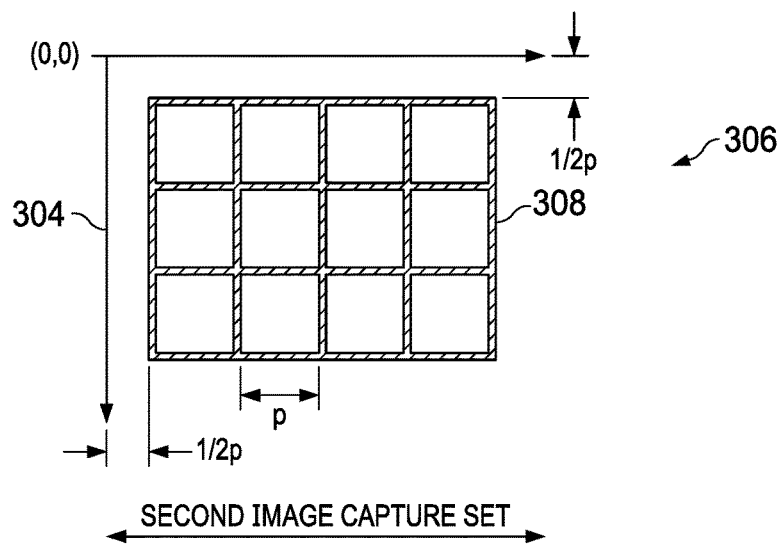

FIG. 3 is a group of charts illustrating the operation of structured-light imaging device 200. Chart 300 in FIG. 3A shows the position of an array of pixels 302 as received by a sensor like sensor 212 (FIG. 2). For reference, axis 304 is shown with the upper, left pixel of array 302 at the origin of axis 304. Chart 306 in FIG. 3B shows a second array 308 relative to axis 304. Chart 300 shows the position of array 302 when movable plate 218 is in one position. Chart 306 shows the position of the same structured light projected from SLM 206 (FIG. 2), but shifted by moving movable plate 218 to position 220 (FIG. 2). In this example, array 308 is offset relative to axis 304 in one direction (down) one-half pixel and in another direction (to the right) by one-half pixel. Structured-light imaging device may use other offset configurations. For example, array 308 may be shifted one-half pixel to the right and an additional array may be shifted one half pixel down.

Figure 3C:
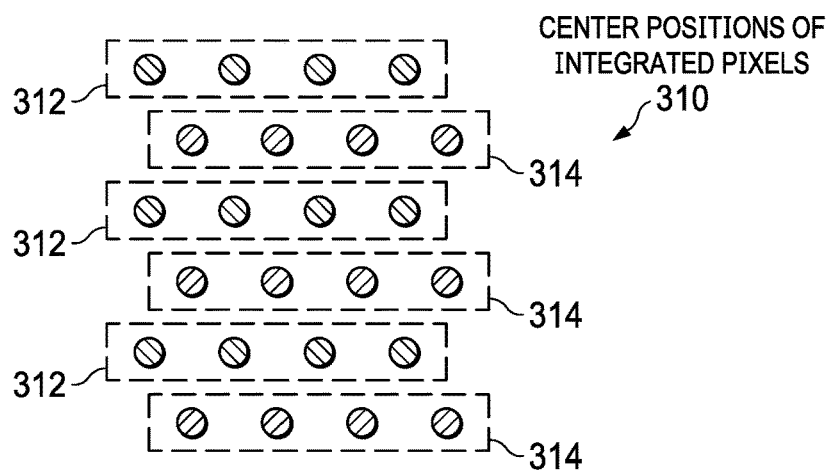

Chart 310 of FIG. 3C shows how processor 216 (FIG. 2) may combine array 302 and array 308. The pixels include intensity data and position data. Processor 216 (FIG. 2) assigns the position data so that the pixels of array 302 are positioned as shown by pixels 312 to provide a combined image. Processor 216 (FIG. 2) assigns the position data so that the pixels of array 308 are positioned as shown by pixels 314. However, when positioned in this manner, the pixels will include overlap data at each corner from adjacent pixels.

For a 100% fill factor and a diagonal offset of half a pixel pitch, optical blurring is adequately modeled by the 2D Finite Impulse Response (FIR) filter of Equation (1).

$$\text{System} = \begin{matrix} \frac{1}{8} & 0 & \frac{1}{8} \\ 0 & \frac{1}{2} & 0 \\ \frac{1}{8} & 0 & \frac{1}{8} \end{matrix} \quad (1)$$

Equation (1) models the blurring induced from overlapped SLM pixels. Equation (2) is a filter to invert the contributions of the adjacent virtual pixels.

$$\text{Inverse} = \begin{matrix} -.0029 & 0 & -0.139 & 0 & -.0029 \\ 0 & -.1283 & 0 & -.1283 & 0 \\ -.0139 & 0 & 1.5805 & 0 & -.0139 \\ 0 & -.1283 & 0 & -.1283 & 0 \\ -.0029 & 0 & -.0139 & 0 & -.0029 \end{matrix} \quad (2)$$

Figure 4:
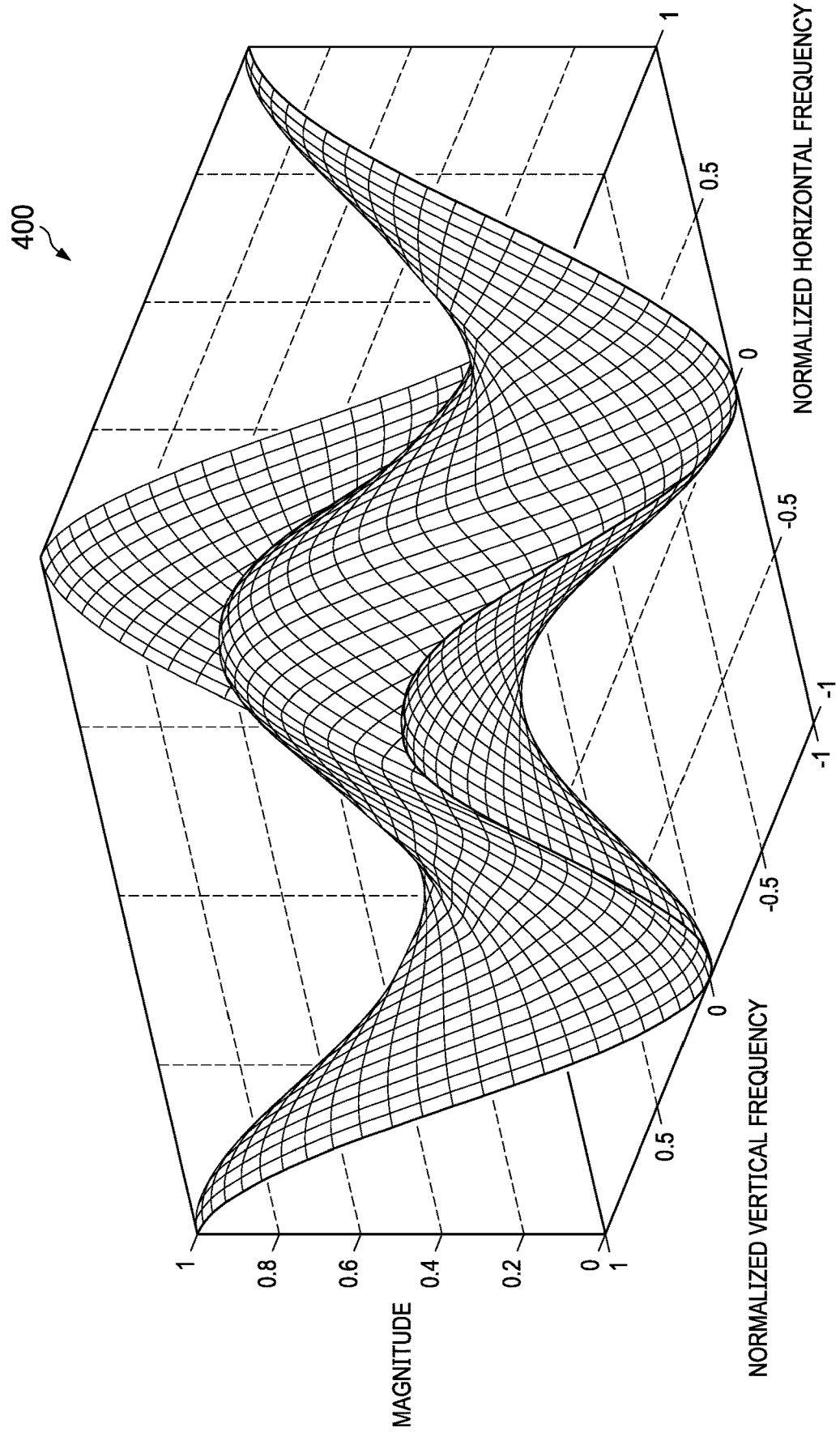
FIG. 4 is a graph showing the blurring effect of the sub-image overlap.
Figure 5:
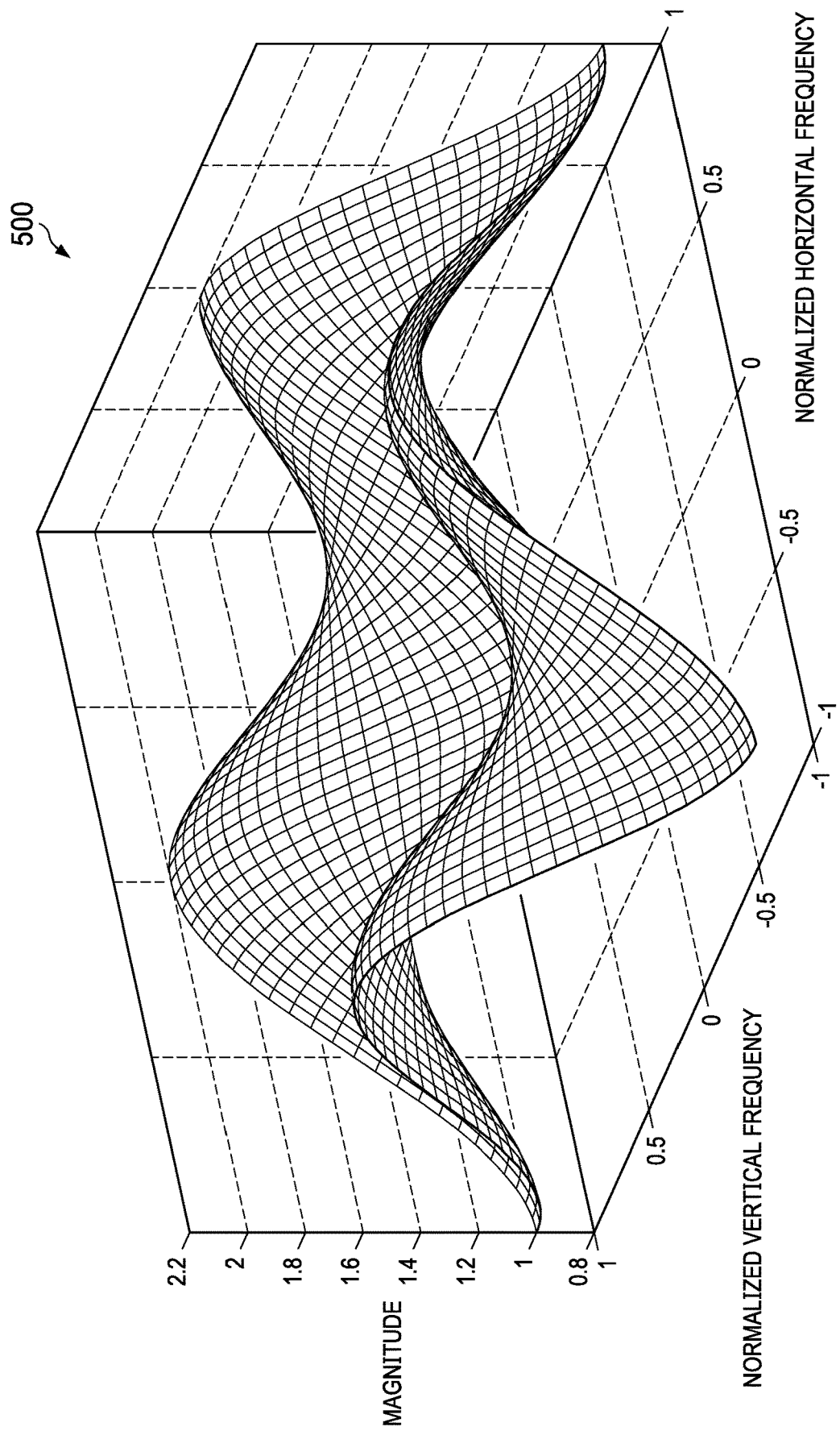
FIG. 5 is a graph showing the effect of an inverse filter.
Figure 6:
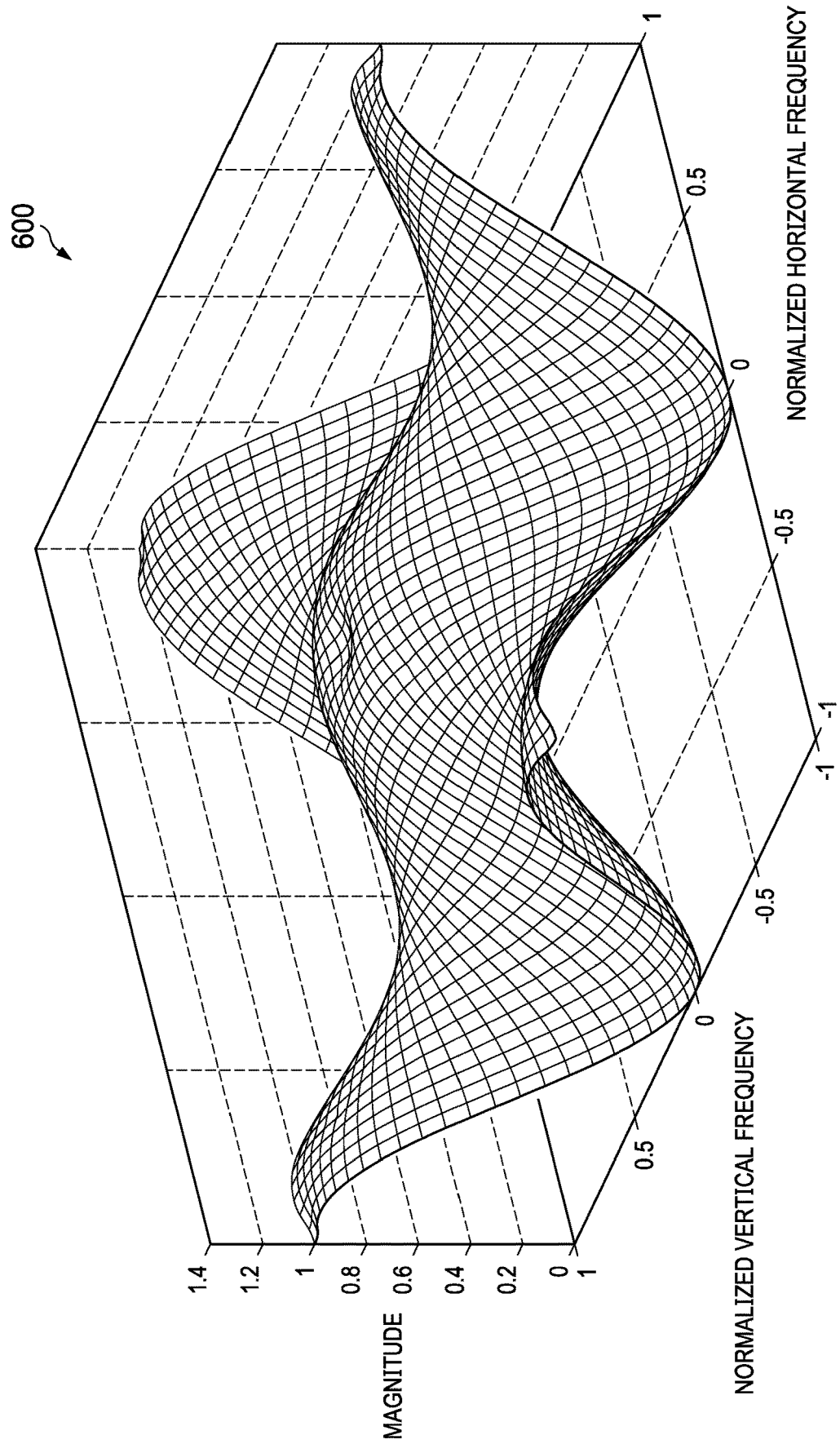
FIG. 6 is a graph showing the convolved result.

FIGS. 4-6 are graphs of magnitude versus frequency for the system, an inverse filter, and their convolved response, respectively. Graph 400 in FIG. 4 shows the blurring effect of the sub-image overlap, which is caused by combining the direct and offset images. Graph 500 in FIG. 5 shows the effect of an inverse filter according to Equation (2) formed for a deconvolution designed to compensate for the blurring. Graph 600 in FIG. 6 shows the convolved result that that de-blurs the virtual pixels. Processor 216 can then use the virtual pixels to determine a higher accuracy image of the surface points of, for example, object 210 (FIG. 2). FIG. 6 shows that applying the inverse filter recaptures a significant amount of high frequency detail. This example is for the worst-case attenuation, when the pixel fill factor is 100%. However, an inverse filter/deconvolution algorithm may be tuned to any fill factor. The deconvolved result compensates for the optical blurring by the convolution of the input signal shown in FIG. 4 with the inverse filter of FIG. 5. As shown in FIGS. 4-6, an inverse filter compensates for optical blurring by applying an inverse filter to the combined direct and offset images, thus providing an image of approximately twice the pixel density of sensor 212. Applying the inverse filter to the combined direct and offset images allows for capture of more accurate three-dimensional image of the object without the expense and complications of using sensors and SLMs with higher pixel density.

Figure 7:
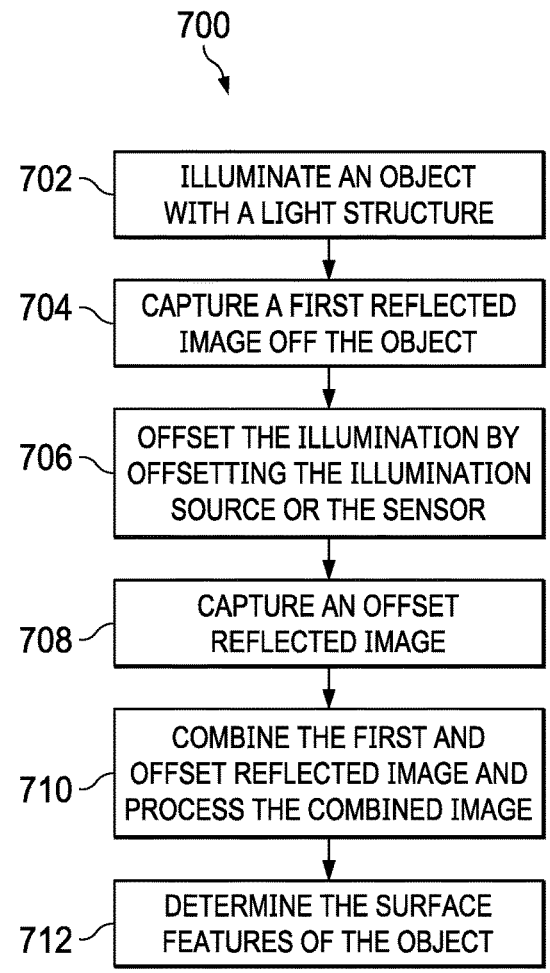
FIG. 7 is a flow diagram of an example method.

FIG. 7 is a flow diagram of an example method 700. Method 700 starts with step 702, which illuminates the object being imaged with a patterned light such as structured light. Step 704 captures a first reflected image off the object. Step 706 offsets either the illumination source or the sensor. Step 708 captures an offset reflected light (offset reflected image). Step 710 combines the first reflected image and the offset reflected image to produce a combined image. Step 712 uses the combined image to determine the surface features of the object.

Figure 8:
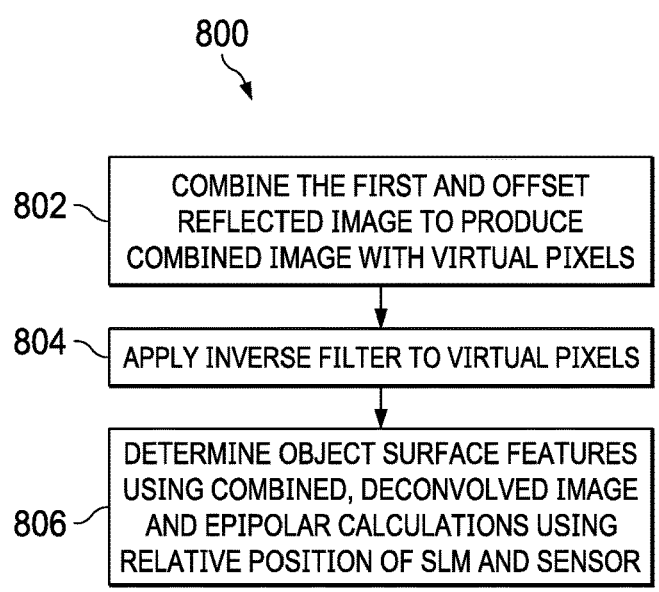
FIG. 8 is a flow diagram detailing a step of the method of FIG. 8.

FIG. 8 is a flow diagram detailing step 710 of FIG. 7. Method 800 corresponds to step 710 (FIG. 7). Step 802 combines the first and offset reflected images to produce a combined image with virtual pixels. Step 804 applies a deconvolution filter to the virtual pixels of the combined image. Step 806 determines the object using the combined, deconvolved image and using epipolar calculations involving the relative position of SLM 206 and sensor 212 (FIG. 2).

Figure 9:
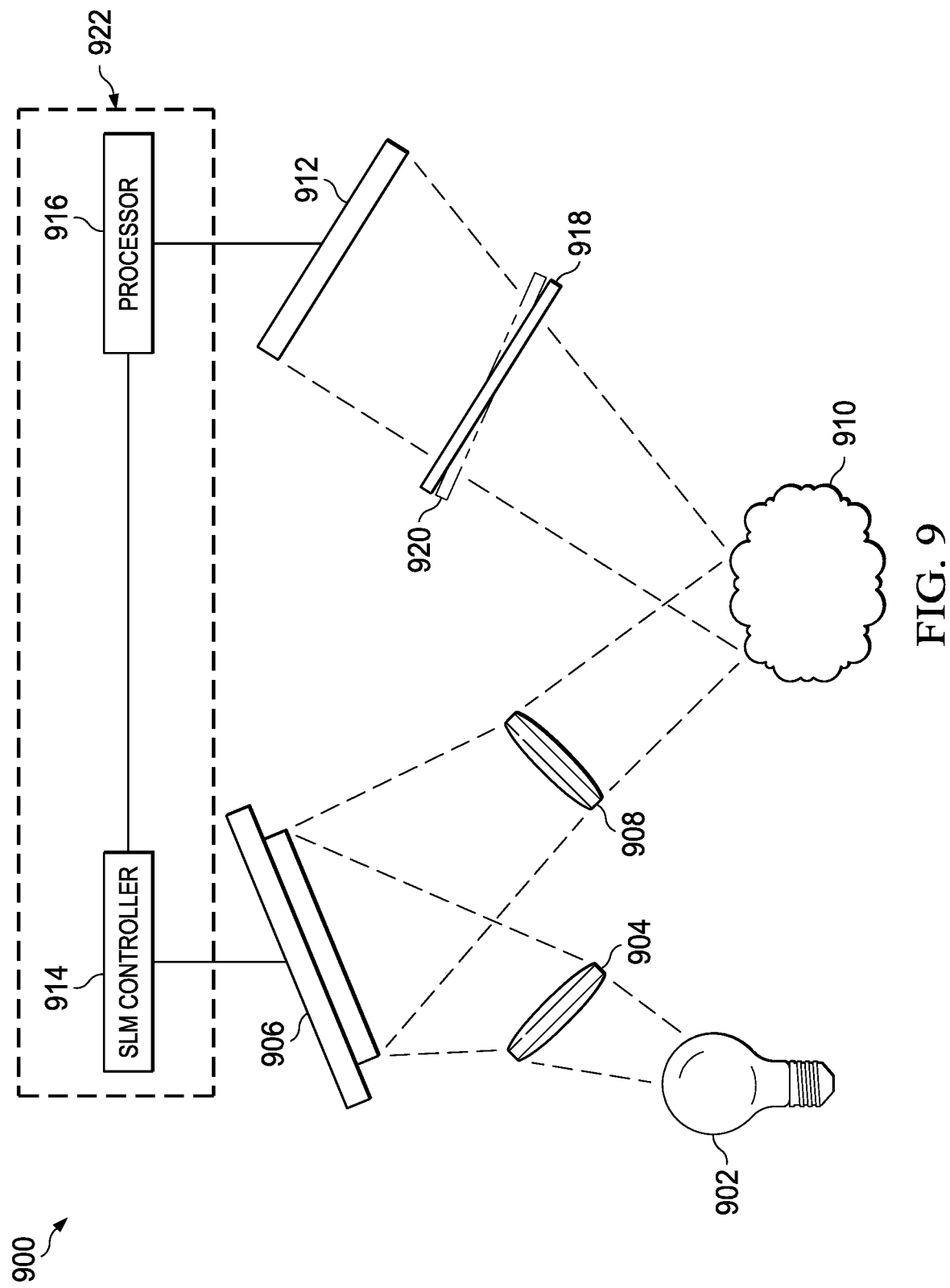
FIG. 9 is a schematic diagram of an example structured-light imaging device.

FIG. 9 is a schematic diagram of an example structured-light imaging device. Light source 902, lens 904, SLM 906, lens 908, object 910, sensor 912, processor 916 and SLM controller 914 of structured-light imaging device 900 are like light source 202, lens 204, SLM 206, lens 208, object 210, sensor 212, processor 216 and SLM controller 214, respectively, of FIG. 2. Movable plate 918 shifts the image reflected from object 910 by for example, one-half pixel by moving to position 920, just as movable plate 218 shifts the structured light from SLM 206 by moving to position 220 (FIG. 2). Shifting the reflected light allows the sensor 912 to capture a direct and offset image that processor 916 processes using the process described regarding FIGS. 3 through 6. In an example, processor 916 and SLM controller 914 are implemented as separate integrated circuits. In another example, processor 916 and SLM controller are implemented as one combined integrated circuit 922. In another example, processor 916 and SLM controller are in a hybrid package including the components in combinations of integrated circuits. Processor 916 is implemented by one of: a microprocessor, microcontroller, digital signal processor (DSP), application specific integrated circuit (ASIC), field programmable gate array (FPGA) or other suitable processing device.

Figure 10:
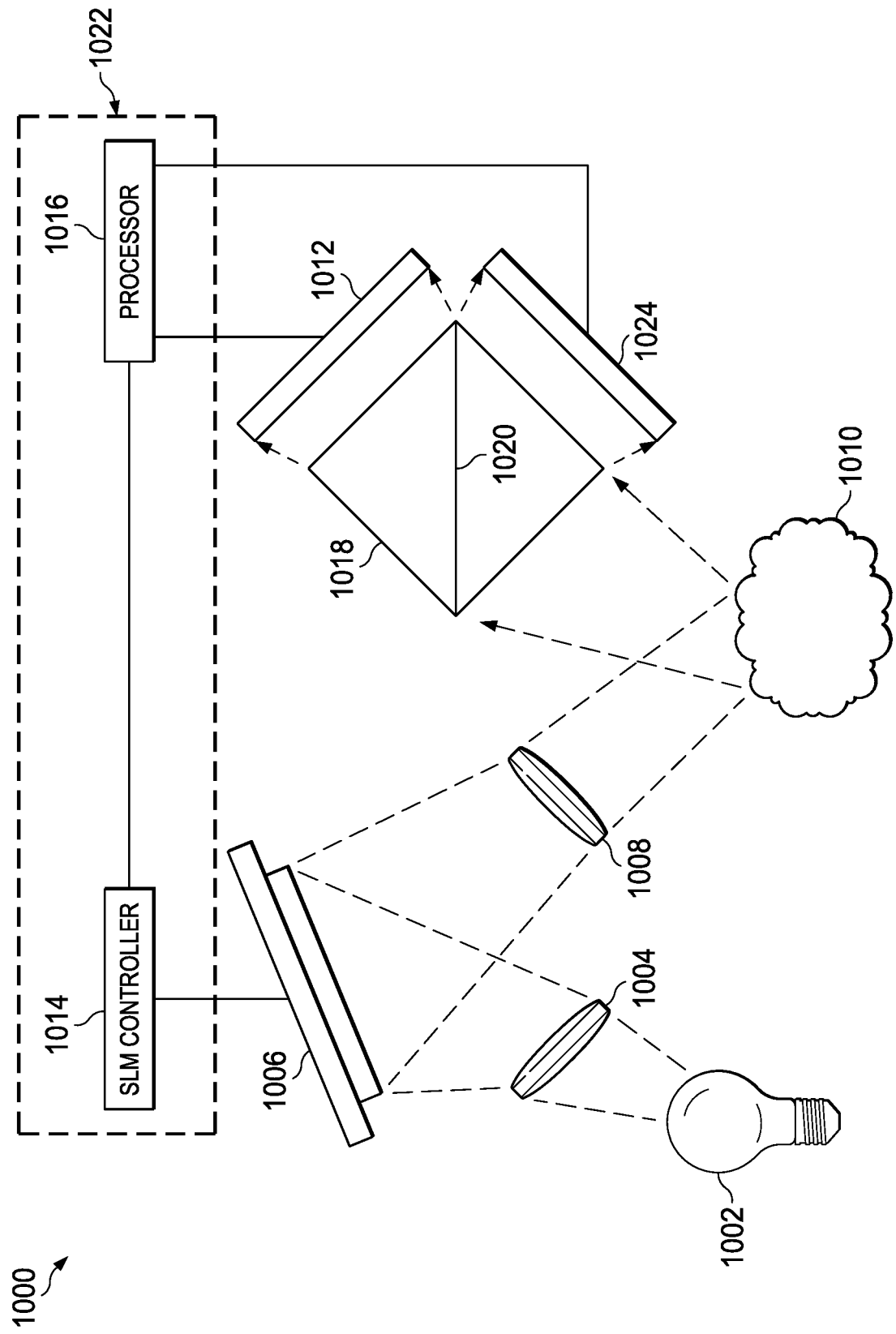
FIG. 10 is a schematic diagram of another example structured-light imaging device.

FIG. 10 is a schematic diagram of another example structured-light imaging device. Light source 1002, lens 1004, SLM 1006, lens 1008, object 1010, sensor 1012, processor 1016 and SLM controller 1014 of structured-light imaging device 1000 are like light source 202, lens 204, SLM 206, lens 208, object 210, sensor 212, processor 216 and SLM controller 214, respectively, of FIG. 2. Prism 1018 includes a selectively reflective layer 1020. Part of the light reflected from object 1010 passes through selectively reflective layer 1020 to sensor 1012. The other part of the light reflected from object 1010 reflects off selectively reflective layer 1020 to sensor 1024. The position of sensors 1012 and 1024 regarding the image reflected from object 1010 are offset from each other, such as by one-half pixel. This provides two sensed images including a direct and an offset image that processor 1016 processes using the process described regarding FIGS. 3 through 6. In an example, processor 1016 and SLM controller 1014 are implemented as separate integrated circuits. In another example, processor 1016 and SLM controller 1014 are implemented on one combined integrated circuit 1022. In another example, processor 1016 and SLM controller 1014 are implemented in a hybrid package including the components in combinations of integrated circuits. Processor 1016 is implemented by one of: a microprocessor, microcontroller, digital signal processor (DSP), application specific integrated circuit (ASIC), field programmable gate array (FPGA) or other suitable processing device.

Figure 11:
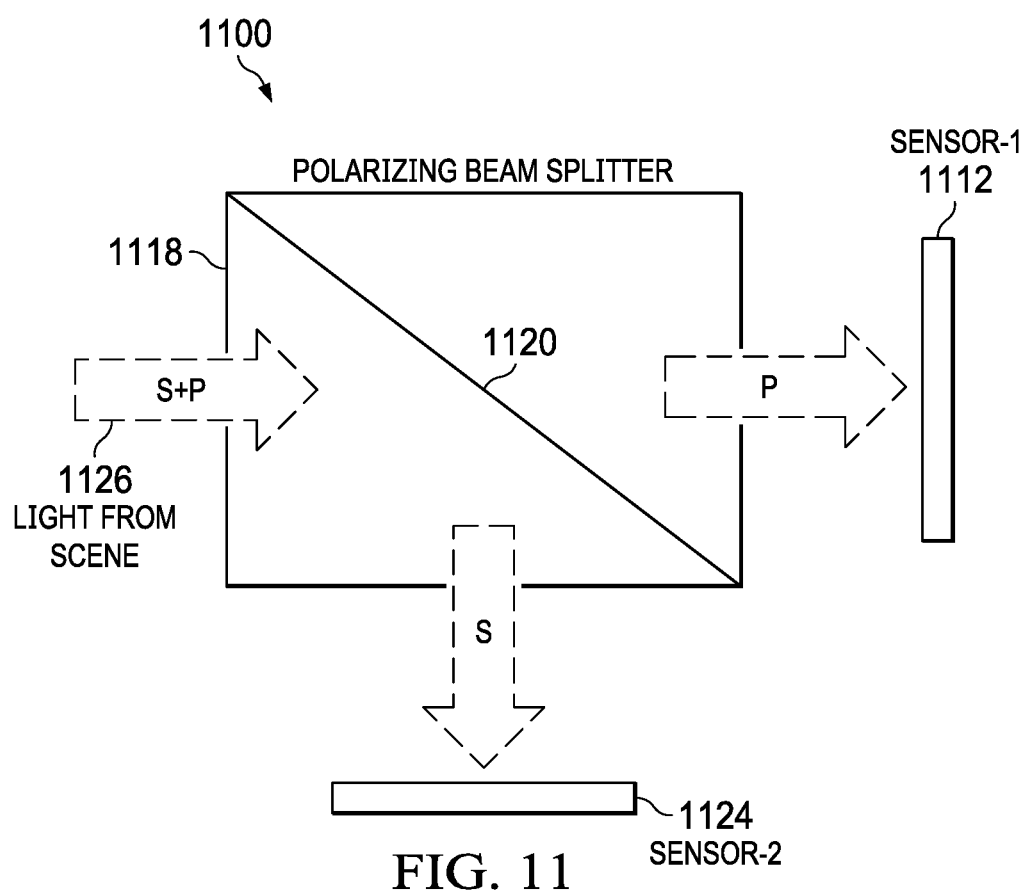
FIG. 11 is drawing of an example beam splitter.

FIG. 11 is drawing of an example beam splitter 1100. Beam splitter 1100 uses polarization diversity to split the light from the scene. Prism 1118 is an example of prism 1018 (FIG. 10). Prism 1118 receives non-polarized light 1126 from the object or scene. Prism 1118 includes polarization selective layer 1120. Non-polarized light 1126 includes both S and P polarized light. The P polarized light passes through polarization selective layer 1120 to sensor 1112. The S polarized light reflects off polarization selective layer 1120 to sensor 1124. The position of sensors 1112 and 1124 regarding the image reflected from object are offset from each other, such as by one-half pixel. This provides a direct and offset image that processor 1016 processes (FIG. 10) using the process described regarding FIGS. 3 through 6.

Figure 12:
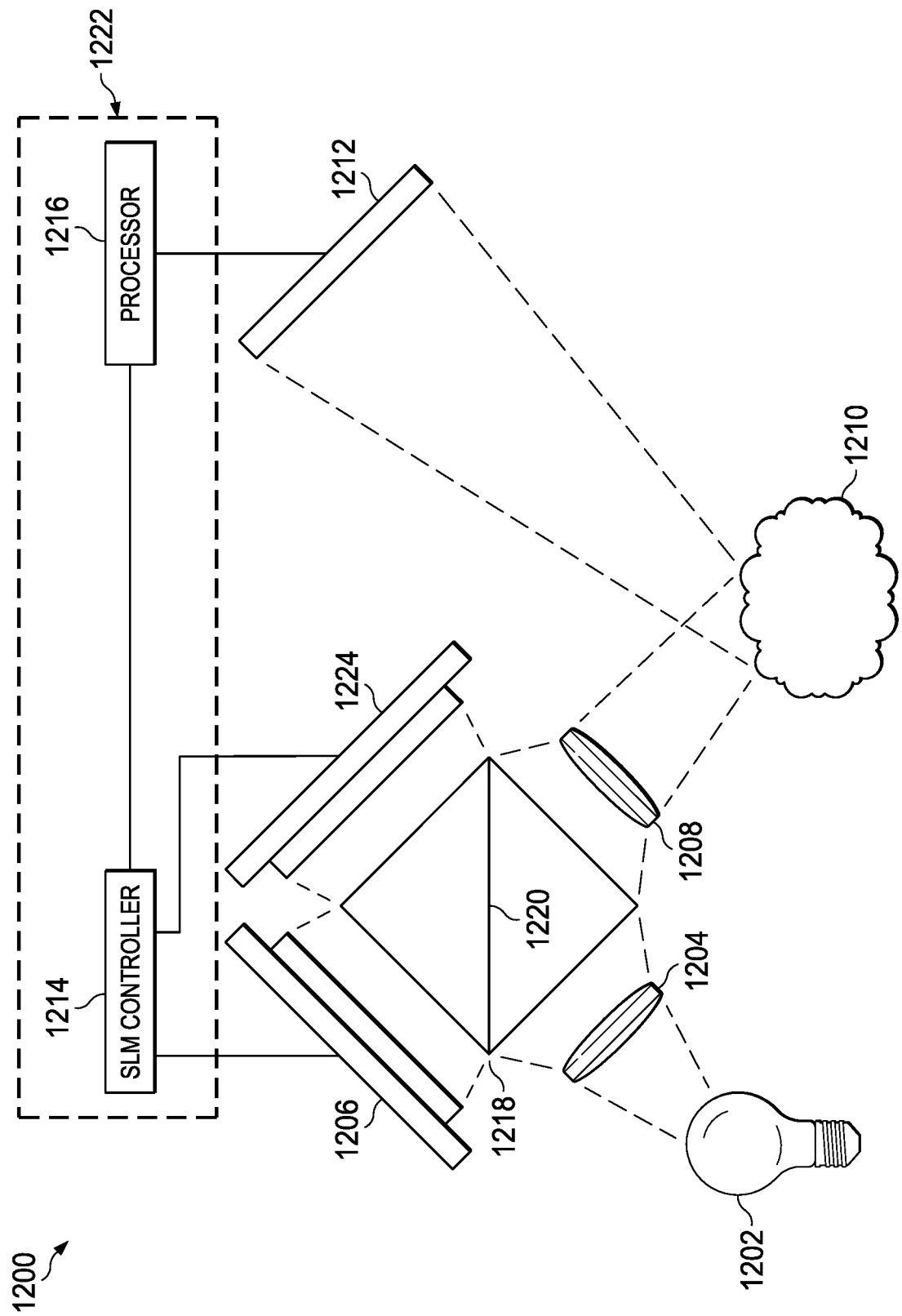
FIG. 12 is a schematic diagram of another example structured-light imaging device.

FIG. 12 is a schematic diagram of another example structured-light imaging device. Light source 1202, lens 1204, SLM 1206, lens 1208, object 1210, sensor 1212, processor 1216 and SLM controller 1214 of structured-light imaging device 1200 are like light source 202, lens 204, SLM 206, lens 208, object 210, sensor 212, processor 216 and SLM controller 214, respectively, of FIG. 2. Prism 1218 includes a selectively reflective layer 1220. As explained further hereinbelow regarding FIG. 13, prism 1218 directs part of the light from lens 1204 to SLM 1206 and the other part to SLM 1224. SLM 1224 provides an image that is offset from SLM 1206. SLM controller 1214 controls the operation of SLM 1206 and SLM 1224 under the direction of processor 1216. To provide a structured-light image and offset image, SLM controller 1214 causes, for example, SLM 1206 to provide the structured light followed by SLM 1224. This allows sensor 1212 to capture a direct structured-light image and an offset image that processor 1216 processes using the process described regarding FIGS. 3 through 6. In an example, processor 1216 and SLM controller 1214 are implemented as separate integrated circuits. In another example, processor 1216 and SLM controller 1214 are implemented on one combined integrated circuit 1222. In another example, processor 1216 and SLM controller 1214 are implemented in a hybrid package including the components in combinations of integrated circuits. Processor 1216 is implemented by one of: a microprocessor, microcontroller, digital signal processor (DSP), application specific integrated circuit (ASIC), field programmable gate array (FPGA) or other suitable processing device.

Figure 13:
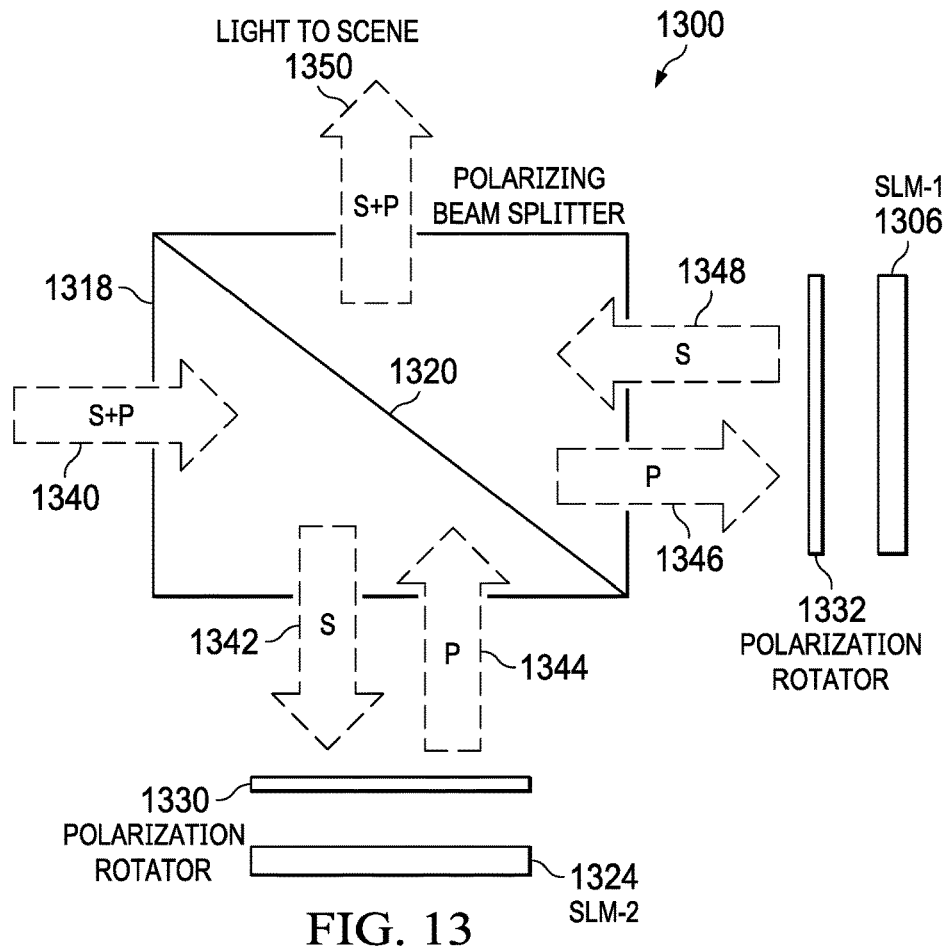
FIG. 13 is a drawing showing the operation of an example beam splitter.

FIG. 13 is a drawing showing the operation of an example beam splitter 1300 compatible with the configuration of FIG. 12. Beam splitter 1300 uses polarization diversity. Light source 1202 and lens 1204 (FIG. 12) provide unpolarized light 1340 to prism 1318. Selectively reflecting layer 1320 reflects S polarized light and allows P polarized light to pass. S polarized light 1342 reflects off selectively reflecting layer 1320, passes through polarization rotator 1330 and reflects off SLM 1324. SLM 1324 reflects the light structure as provided by SLM controller 1214 (FIG. 12). Polarization rotator rotates the polarization of S polarized light 45 degrees. Polarization rotator then rotates the light reflected from SLM 1324 another 45 degrees. Therefore, the structured light is now P polarized light 1344. P polarized light 1344 passes through selectively reflecting layer 1320 and out of prism 1318 as light 1350. Conversely, P polarized light 1346 passes through selectively reflecting layer 1320 and polarization rotator 1332 rotates polarized light 1346 by 45 degrees. This light reflects off SLM 1306, which is offset relative to SLM 1324. The light reflected off SLM 1306 again passes through polarization rotator 1332, and is thus S polarized light 1348. S polarized light 1348 reflects off selectively reflecting layer 1320 as part of light 1350. Thus, light 1350 includes P polarized light 1344 and S polarized light 1348. One of SLMs 1306 and 1324 provides an offset image. Therefore, the example of beam splitter 1300 provides offset images of the structured light.

Figure 14:
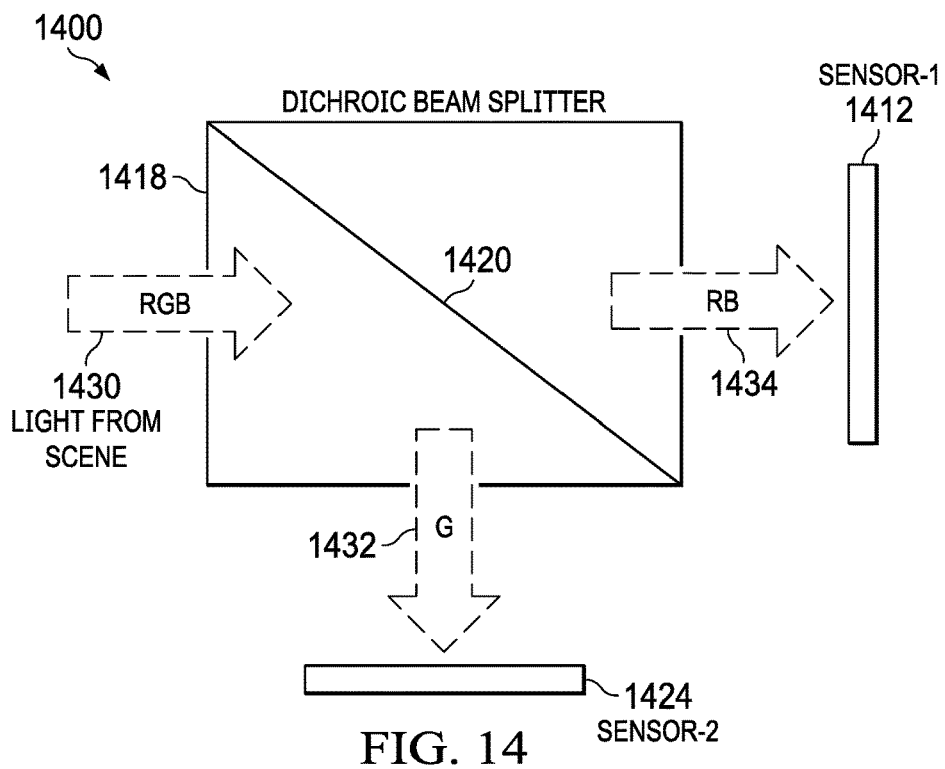
FIG. 14 is a drawing of another beam splitting configuration.

FIG. 14 is a drawing of another beam splitting configuration useful in the configuration of FIG. 10. Beam splitter 1400 uses frequency diversity to split the light 1430 from the scene. Light 1430 is light from object 1010 (FIG. 10), that is, light from the scene. Prism 1418 includes dichroic layer 1420. In this example, dichroic layer 1420 reflects green light and allows other colored light to pass. Therefore, dichroic layer 1420 reflects green light 1432 to sensor 1424 and allows red/blue light 1434 to pass to sensor 1412. One of sensors 1412 or 1424 is offset relative to the other sensor. Therefore, beam splitter 1400 provides direct and offset images based on the color of the light. Any differences in the intensity between the green light 1432 and the red/blue light 1432 as reflected in the RGB content of light provided by light source 1002 (FIG. 10) are corrected mathematically by processor 1016. In another example, a selectively reflecting layer replaces dichroic layer 1420 where the selectively reflecting layer reflects one polarization of light and allows another polarization of light.

Figure 15:
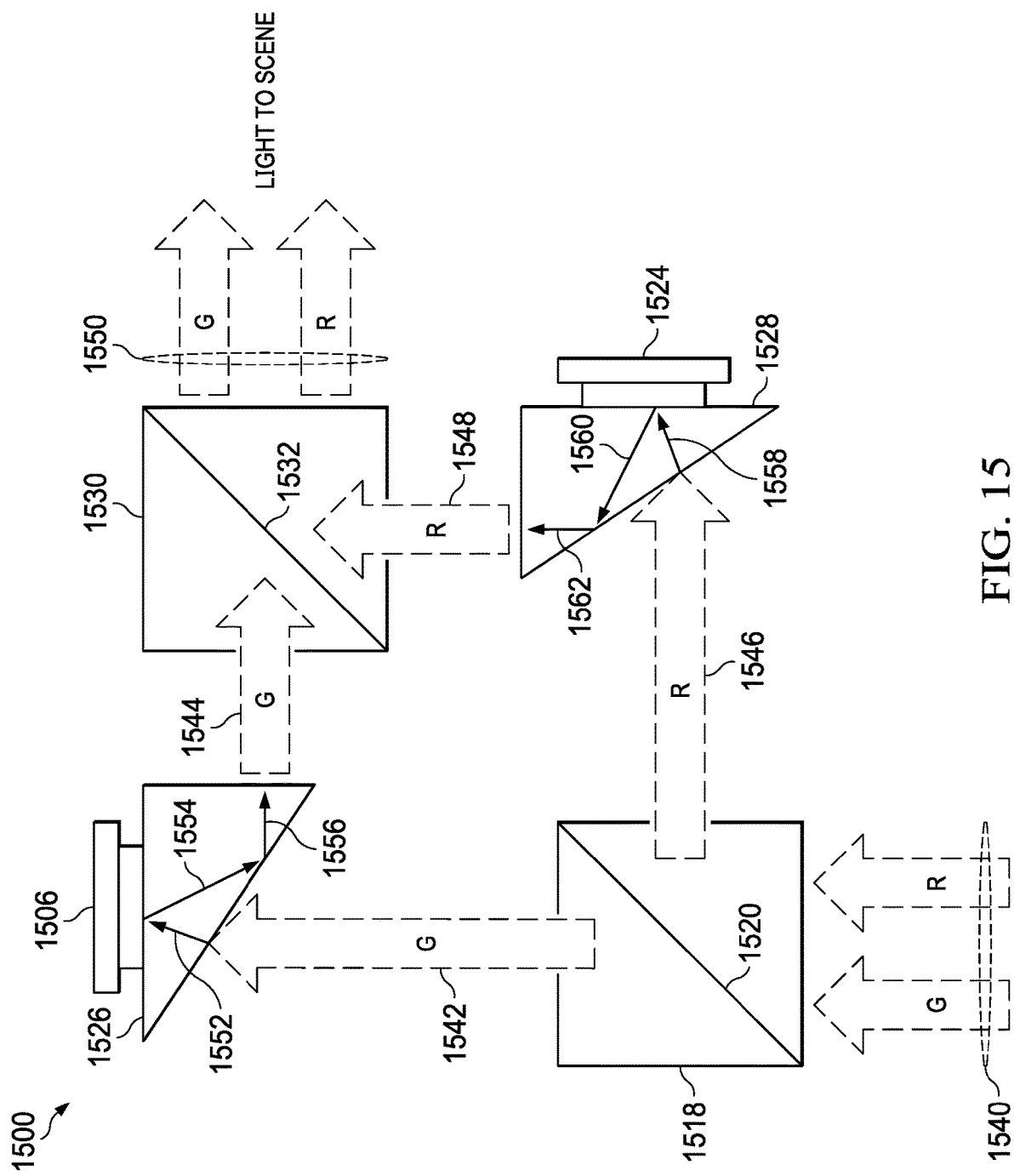
FIG. 15 is a drawing showing the operation of an example beam splitter.

FIG. 15 is a drawing showing the operation of an example beam splitter 1500 compatible with the configuration of FIG. 12. Beam splitter 1500 uses frequency diversity. Light source 1540 provides at least two frequencies of light. In this example, light source 1540 provides red and green light. An example light source is a combination of red and green lasers or light-emitting diodes. Prism 1518 includes dichroic layer 1520 that reflects red light and allows other frequencies of light to pass. Therefore, the green portion of light source 1540 passes as green light 1542 and the red portion of light source 1540 reflects as red light 1546. Green light 1542 enters the angled portion of prism 1526. Prism 1526 has a larger index of refraction than the surrounding air, so green light 1542 bends to light 1552 according to Snell's Law. Light 1552 reflects off SLM 1506 to provide modulated green light 1554. As noted above, prism 1526 has a larger index of refraction than the surrounding air. If light strikes the boundary between the prism and the air at greater than a critical angle, the light reflects by total internal reflection (TIR) as shown with modulated light 1556.

Similarly, red light 1546 bends at the boundary of prism 1528 to provide red light 1558. Red light 1558 reflects off SLM 1524 to provide modulated red light 1560, which reflects off the boundary of prism 1528 by TIR, to provide modulated red light 1562, which exits prism 1528 as modulated red light 1548. SLM 1506 and SLM 1524 are offset relative to their respective optical pathways. Prism 1530 includes dichroic layer 1532. Dichroic layer 1532 in this example reflects red light. Thus, modulated green light 1544 passes through dichroic layer 1532 and modulated red light 1548 reflects off dichroic layer 1532. Modulated green light 1544 and modulated red light 1548 thus combine to provide output light 1550 to the measured object ("light to scene"). The offset of SLM 1506 and SLM 1524 provides direct and offset images of the structured light in output light 1550.

Figure 16:
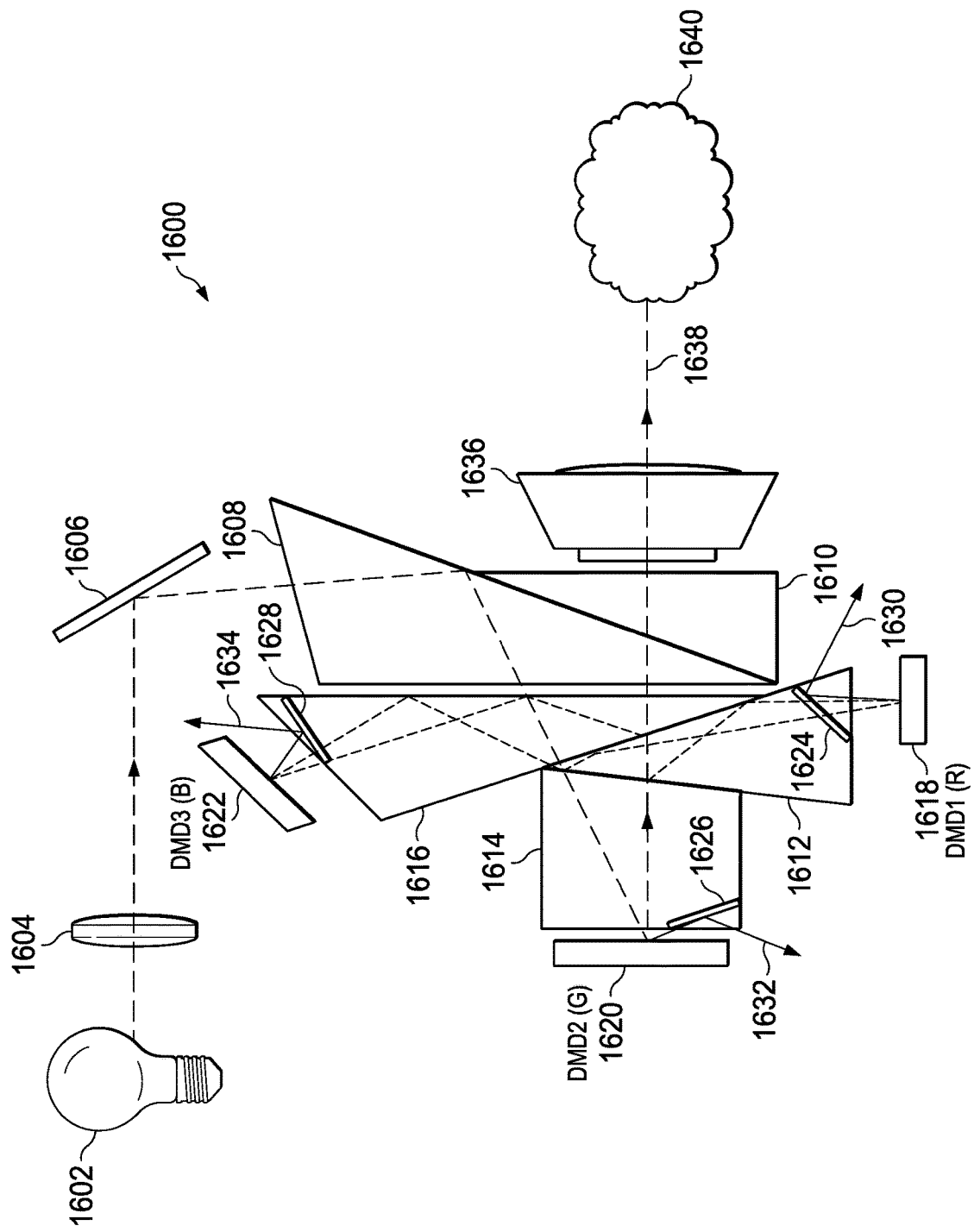
FIG. 16 is a schematic diagram of multi-SLM prism system.

FIG. 16 is a schematic diagram of multi-SLM prism system. Prism system 1600 includes light source 1602 and lens 1604 that perform similar functions to light source 1202 and lens 1204 (FIG. 12). Rather than two SLMs 1206 and 1224 (FIG. 12), prism system 1600 uses three SLMS. In this example, the SLMs are DMD 1618, DMD 1620 and DMD 1622. Prisms 1608, 1610, 1612, 1614, 1616 direct the light provided by light source 1602 via lens 1604 and mirror 1606 to DMD 1618, DMD 1620 and DMD 1622 using the principle of total internal reflection (TIR) where the light reflects if it strikes a surface at less than a critical angle and transmits through the surface if it strikes the surface at greater than the critical angle. In this example, prisms, 1612, 1614 and 1616 direct red (R), green (G) and blue (B) light, respectively, to DMD 1618, DMD 1620 and DMD 1622, respectively. DMDs 1618, 1620 and 1622 are offset from each other regarding the transmitted structured image like SLMs 1206 and 1224 (FIG. 12) are offset from each other. Prisms 1608, 1610, 1612, 1614, and 1616 combine the light reflected from the ON pixels of each of the DMDs and direct the combined light image 1638 to object 1640 via lens 1636. Surfaces 1624, 1626 and 1628 reflect the light from the OFF pixels 1630, 1632 and 1634, respectively, away to light traps (not shown). By projecting and capturing a structured image successively from the DMDs, a combined image with three offset images provides an output of nearly triple the pixel density of DMDs 1618, 1620 and 1622 and sensor 1212 (FIG. 12).

Figure 17:
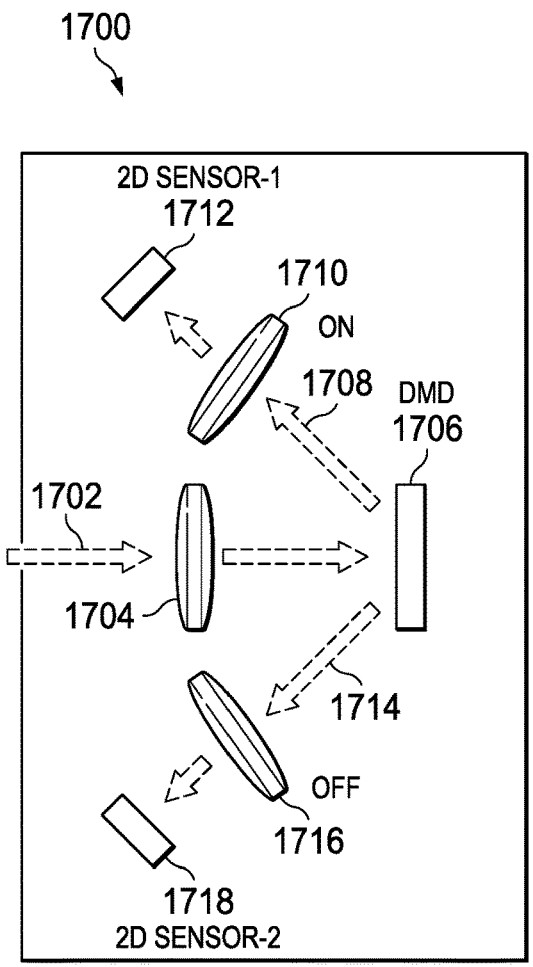
FIG. 17 is a schematic diagram of an example image direction device that provides spatio-temporal multiplexing.

FIG. 17 is a schematic diagram of an example image direction device that provides spatio-temporal multiplexing. Image direction device 1700 directs light reflected from an object like object 1010 (FIG. 10) to two sensors 1712 and 1718 like prism 1018 directs the reflected image from object 1010 to sensors 1012 and 1024 (FIG. 10). Lens 1704 focuses light 1702 onto DMD 1706. As explained hereinbelow regarding FIGS. 17 and 18, the surface of DMD 1706 has micromirrors that can selectively tilt, such as by ±10 degrees relative to the surface of DMD 1706. Therefore, tilting the mirrors to the "ON" position causes light 1702 to reflect as light 1708, which lens 1710 focuses onto sensor 1712. On the other hand, tilting the mirrors to the "OFF" position causes light 1702 to reflect as light 1714, which lens 1716 focuses onto sensor 1718. Therefore, DMD 1706 serves as a directing device to selectively direct the light to different selected sensors at different times. Sensors 1712 and 1718 are offset relative to the structured light image like sensors 1012 and 1024 (FIG. 10) are offset. Therefore, image direction device enables capturing a direct and offset image that processor 1016 processes (FIG. 10) using the process described regarding FIGS. 3 through 6.

Figure 18:
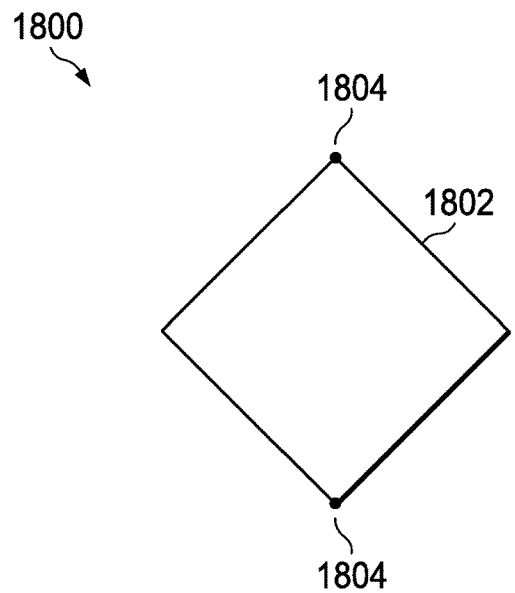
FIG. 18 is a view of one mirror of a DMD.

FIG. 18 is a view of one mirror of a DMD 1706 (FIG. 17) as seen from the reflecting surface of the DMD. View 1800 shows mirror 1802. Mirror 1802, in this example, has a square configuration with pivot points 1804 at opposing corners of mirror 1802.

Figure 19:
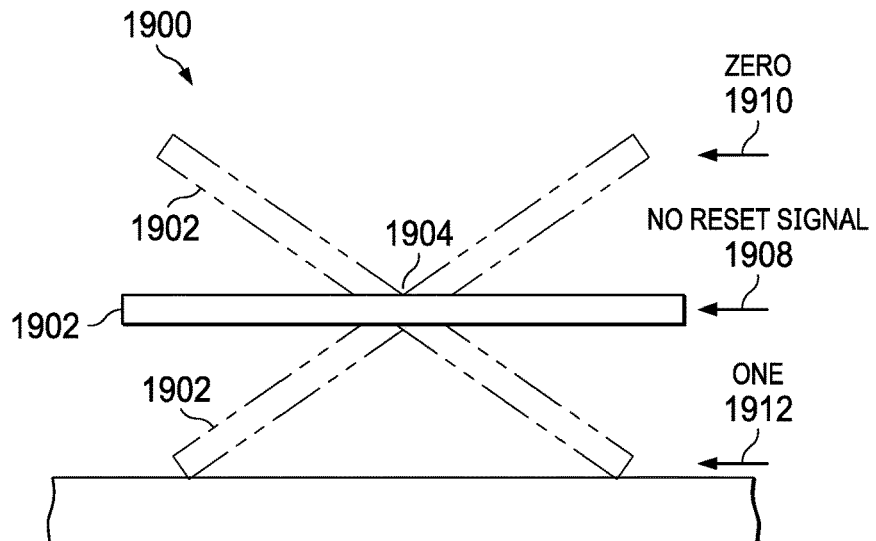
FIG. 19 is a side view of a mirror like that of FIG. 17.

FIG. 19 is a side view of a mirror like that of FIG. 18. View 1900 shows mirror 1902. Mirror 1902 is like mirror 1802 of FIG. 18. Pivot points 1904 are at the corner of mirror 1902 like pivot points 1804 of FIG. 18. Pivot connections (not shown) suspend mirror 1902 from substrate 1906 by pivot points 1904. To change the state of mirror 1902, a memory cell (not shown) associated with mirror 1902 receives a data bit of one (ON) or zero (OFF). After loading the data bit into the memory cell, a reset signal applied to the entire DMD or to reset groups on the DMD causes mirror 1902 to take the zero position 1910 or the one position 1912. With no reset signal, mirror 1902 is parallel to the surface of substrate 1906 at no reset signal position 1908. In one of these three positions, for example the ON position 1912, sensor 1712 (FIG. 17) receives the light reflected off mirror 1902. In another position, for example the OFF position 1910, sensor 1718 (FIG. 17) receives the light reflected off mirror 1902. In some examples, light traps capture the light reflected off the mirror in the other positions to avoid corrupting measurement of the desired light signal. A DMD can contain many mirrors like mirror 1902. For example, a DMD configured for high definition (HD) television includes 1920×1080 or over two million mirrors.

Figure 20:
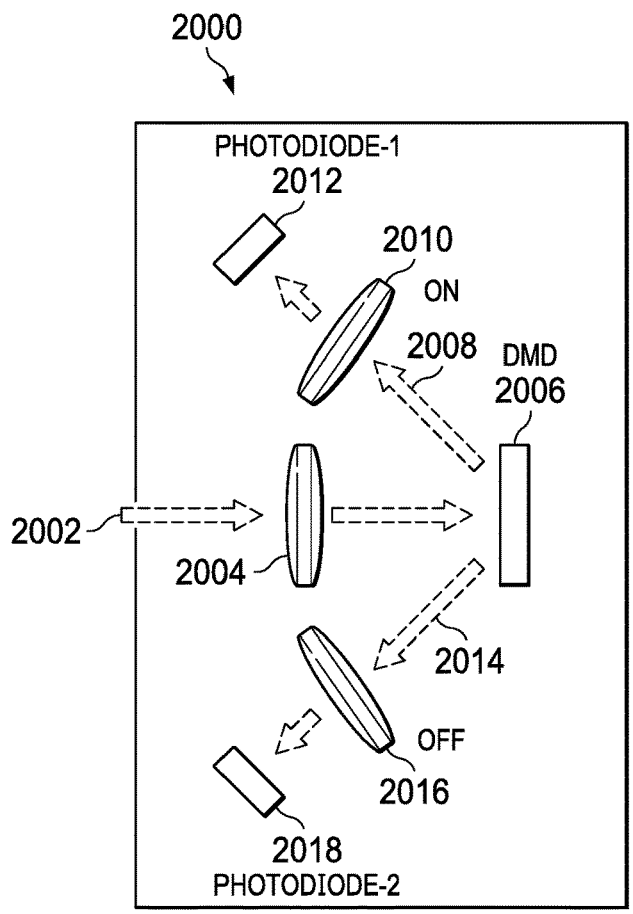
FIG. 20 is a schematic diagram of another example image direction device that provides spatio-temporal multiplexing.

FIG. 20 is a schematic diagram of another example image direction device that provides spatio-temporal multiplexing. Image direction device 2000 directs light reflected from an object like object 1010 (FIG. 10) to two photodiodes 2012 and 2018 like prism 1018 directs the reflected image from object 1010 to sensors 1012 and 1024 (FIG. 10). Image direction device uses a principle called compressive imaging to obtain data on the surface of the object, like object 1010. Compressive imaging derives its name from file compression. In its simplest form, file compression determines when data points have identical or similar data and replaces many of such data points with tokens or symbols. Compressive imaging assumes that the scene includes many identical or similar data points and determines the scene using a fraction of the data input needed to scan the entire scene. Donoho, "Compressive Sensing," IEEE Transactions on Information Theory, Vol. 52, No. 4 (April 2006), which is wholly incorporated herein by reference, among other literature, explains the mathematics behind selecting the data points and determining the scene therefrom. Briefly, the SLM projects a group of data points in the form of a binary mask, which is usually in the form of a pseudo-random pattern, for capture by the photodiode. Compressive imaging is applicable to each example explained herein, in which case photodiodes or groups of photodiodes replace the sensor arrays.

In image direction device 2000, lens 2004 focuses light 2002 onto DMD 2006. As explained hereinabove regarding FIGS. 18 and 19, the surface of DMD 2006 has micromirrors that can selectively tilt, such as by ±10 degrees relative to the surface of DMD 2006. Therefore, tilting the mirrors to the "ON" position causes light 2002 to reflect as light 2008, which lens 2010 focuses onto photodiode 2012. On the other hand, tilting the mirrors to the "OFF" position causes light 2002 to reflect as light 2014, which lens 2016 focuses onto photodiode 2018. Therefore, like DMD 1706 (FIG. 17), DMD 2006 serves as a directing device to selectively direct the light to different selected sensors at different times. In this example, the arrangement of photodiodes 2012 and 2018 creates a diagonal offset to improve diversity. Compressive imaging often uses patterned light such as a pseudo-random pattern for the projected light. One photodiode captures the inverse (or dual) of that pattern in synchronization with the other photodiode to provide a pseudo-random image. This increases the number of observations and information diversity without sacrificing temporal resolution. Using multiple photodiodes and/or multiple SLMs allows for accelerating capture of the compressive sensing data points, thus providing more efficient image capture.

Modifications are possible in the described examples, and other examples are possible, within the scope of the claims.

What is claimed is:

1. A system comprising:
    a controller configured to provide a structured light image;
    a processor coupled to the controller, the processor configured to:
        receive a first image of a first reflection of a projection of the structured light image;
        receive a second image of a second reflection of the projection of the structured light image, the second image spatially offset from the first image;
        produce a combined image based on the first image and the second image, wherein the combined image comprises a pseudo-random image;
        perform compressive imaging on the combined image to produce a compressive image;
        apply an inverse filter to the compressive image, to produce a filtered image; and
        perform triangulation between the structured light image and the filtered image to perform object detection.

2. The system of claim 1, wherein the first image and the second image are offset by one-half pixel in a first direction and by one-half pixel in a second direction perpendicular to the first direction.

3. The system of claim 1, wherein the controller is a first controller, the system further comprising:
    a first spatial light modulator coupled to the first controller;
    a second controller;
    a second spatial light modulator coupled to the second controller;
    a polarizing beam splitter;
    a first polarization rotator optically coupled between the first spatial light modulator and the polarizing beam splitter; and
    a second polarization rotator optically coupled between the second spatial light modulator and the polarizing beam splitter.

4. The system of claim 1, wherein the controller is a first controller, the system further comprising:
    a first spatial light modulator coupled to the first controller;
    a first prism optically coupled to the first spatial light modulator, the first prism comprising a first dichroic layer;
    a second controller;
    a second spatial light modulator coupled to the second controller;
    a second prism optically coupled to the second spatial light modulator, the second prism comprising a second dichroic layer;
    a third prism optically coupled to the first prism and to the second prism; and
    a fourth prism optically coupled to the first prism and to the second prism, the fourth prism comprising a third dichroic layer, the fourth prism configured to:
        receive light having a first color and a second color;
        direct a first portion of the light having the first color towards the first prism; and
        direct a second portion of the light having the first color towards the second prism;
    wherein the first prism is configured to direct the first portion of the light towards the first spatial light modulator;
    the first spatial light modulator configured to modulate the first portion of the light to produce first modulated light;
    the first prism configured to direct the first modulated light towards the third prism;
    the second prism configured to direct the second portion of the light towards the second spatial light modulator;
    the second spatial light modulator configured to modulate the second portion of the light to produce second modulated light;
    the second prism configured to direct the second modulated light towards the third prism; and
    the third prism configured to combine the first modulated light and the second modulated light.

5. A system comprising:
    a light source configured to provide illumination light;
    a spatial light modulator optically coupled to the light source, the spatial light modulator configured to produce patterned light based on the illumination light;
    a first sensor;
    a second sensor;
    a digital micromirror device (DMD);
    a first lens configured to receive a reflection of the patterned light and direct the reflection of the patterned light towards the DMD;
    a second lens; and
    a third lens;
    wherein the DMD is configured to direct a first portion of the reflection towards the second lens and to direct a second portion of the reflection towards the third lens;
    wherein the second lens is configured to direct the first portion of the reflection towards the first sensor;
    wherein the third lens is configured to direct the second portion of the reflection towards the second sensor; and
    wherein the first sensor is configured to produce a first image based on the first portion of the reflection and the second sensor is configured to produce a second image based on the second portion of the reflection, the second image spatially offset from the first image; and a processor coupled to the first sensor and to the second sensor, the processor configured to combine the first image and the second image to produce a combined image.

6. The system of claim 5, wherein the first sensor and the second sensor are sensor arrays.

7. The system of claim 5, wherein the first and second sensors are photodiodes.

8. The system of claim 5, wherein the patterned light is a pseudo-random image and the processor is configured to perform compressive imaging.

9. The system of claim 5, wherein the DMD is configured to direct the first portion of the reflection to the first sensor during a first time period and to direct the second portion of the reflection to the second sensor during a second time period.

10. The system of claim 5, wherein the processor is further configured to apply an inverse filter to the combined image.

11. A system comprising:
a light source configured to provide illumination light;
a spatial light modulator optically coupled to the light source, the spatial light modulator configured to produce patterned light based on the illumination light;
a sensor; and
a movable plate optically coupled to the sensor, the movable plate configured to:
   direct a first portion of a reflection of the patterned light towards the sensor; and
   rotate to direct a second portion of the reflection of the patterned light towards the sensor to shift the reflection of the patterned light, wherein the second portion of the reflection of the patterned light is laterally shifted with respect to the first portion of the reflection of the patterned light;
wherein the sensor is configured to produce a first image based on the first portion of the reflection and to produce a second image based on the second portion of the reflection;
the system further comprising:
a controller coupled to the spatial light modulator, the controller configured to provide a structured light image to the spatial light modulator;
a processor coupled to the controller, the processor configured to:
   receive the first image;
   receive the second image;
   produce a combined image based on the first image and the second image; and
   perform triangulation between the structured light image and the combined image to perform object detection.

12. The system of claim 11, wherein the processor is further configured to apply an inverse filter to the combined image.

13. A system comprising:
a first spatial light modulator;
a first prism optically coupled to the first spatial light modulator, the first prism comprising a first dichroic layer;
a second spatial light modulator;
a second prism optically coupled to the second spatial light modulator, the second prism comprising a second dichroic layer;
a third prism optically coupled to the first prism and to the second prism; and a fourth prism optically coupled to the first prism and to the second prism, the fourth prism comprising a third dichroic layer, the fourth prism configured to:
   receive light having a first color and a second color;
   direct a first portion of the light having the first color towards the first prism; and
   direct a second portion of the light having the first color towards the second prism;
the first prism is configured to direct the first portion of the light towards the first spatial light modulator;
the first spatial light modulator configured to modulate the first portion of the light to produce first modulated light;
the first prism configured to direct the first modulated light towards the third prism;
the second prism configured to direct the second portion of the light towards the second spatial light modulator;
the second spatial light modulator configured to modulate the second portion of the light to produce second modulated light;
the second prism configured to direct the second modulated light towards the third prism; and
the third prism configured to combine the first modulated light and the second modulated light.

14. The system of claim 13, further comprising:
a controller coupled to the first spatial light modulator, the controller configured to provide a structured light image;
a processor coupled to the controller, the processor configured to:
   receive a first image of a first reflection of a projection of the structured light image;
   receive a second image of a second reflection of the projection of the structured light image, the second image spatially offset from the first image;
   produce a combined image based on the first image and the second image;
   apply an inverse filter to the combined image, to produce a filtered image; and
   perform triangulation between the structured light image and the filtered image to perform object detection.

15. A system comprising:
a first spatial light modulator;
a second spatial light modulator;
a first polarization rotator;
a second polarization rotator; and
a polarizing beam splitter configured to receive first light, to direct a first portion of the first light having a first polarization towards the first polarization rotator and to direct a second portion of the first light having a second polarization towards the second polarization rotator, the second polarization different that the first polarization, wherein:
   the first polarization rotator is configured to polarization rotate the first portion of the first light to produce second light;
   the first spatial light modulator is configured to modulate the second light to produce third light;
   the first polarization rotator is configured to polarization rotate the third light to produce fourth light having the second polarization and to direct the fourth light towards the polarizing beam splitter;
   the second polarization rotator is configured to polarization rotate the second portion of the second light to produce fifth light;

the second spatial light modulator is configured to modulate the fifth light to produce sixth light; and the second polarization rotator is configured to polarization rotate the sixth light to produce seventh light having the first polarization and to direct the seventh light towards the polarizing beam splitter.

* * * * *